(12) United States Patent  (10) Patent No.: US 7,088,382 B2
Kim  (45) Date of Patent: Aug. 8, 2006

(54) IMAGING OPTICAL SYSTEM, IMAGE FORMING APPARATUS HAVING THE SAME, AND A METHOD THEREFOR

(75) Inventor: Hyung-su Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/200,759

(22) Filed: Oct. 18, 2002

(65) Prior Publication Data

US 2003/0128268 A1    Jul. 10, 2003

(30) Foreign Application Priority Data

Jan. 9, 2002    (KR) .......................... 2002-0001199

(51) Int. Cl.
*B41J 2/435* (2006.01)
*B41J 15/14* (2006.01)
*G02B 26/08* (2006.01)

(52) U.S. Cl. ...................... 347/234; 347/241; 359/204

(58) Field of Classification Search ................ 347/244, 347/241, 256, 258, 236, 116, 235, 205, 259, 347/242, 257, 234; 359/196, 216, 210, 201, 359/205, 204, 206, 207
See application file for complete search history.

(56) References Cited

U.S. PATENT DOCUMENTS

| | | | | | |
|---|---|---|---|---|---|
| 4,358,793 | A | * | 11/1982 | Hosaka et al. | 358/480 |
| 4,474,422 | A | * | 10/1984 | Kitamura | 359/204 |
| 4,518,232 | A | * | 5/1985 | Dagenais | 359/853 |
| 4,630,129 | A | * | 12/1986 | Hayashi et al. | 358/296 |
| 4,701,035 | A | * | 10/1987 | Hirose | 359/366 |
| 4,878,066 | A | * | 10/1989 | Shiraishi | 347/235 |
| 4,886,963 | A | * | 12/1989 | Ohmori | 250/235 |
| 5,028,128 | A | * | 7/1991 | Onuki | 353/122 |
| 5,047,800 | A | * | 9/1991 | Fukumoto et al. | 355/45 |
| 5,103,091 | A | * | 4/1992 | Hirose et al. | 250/235 |
| 5,146,360 | A | * | 9/1992 | Yamakawa | 359/216 |
| 5,148,304 | A | * | 9/1992 | Kawabata | 359/207 |
| 5,150,250 | A | * | 9/1992 | Setani | 359/221 |
| 5,315,321 | A | * | 5/1994 | Peled et al. | 347/234 |
| 5,353,047 | A | * | 10/1994 | Nakamura et al. | 347/261 |
| 5,367,327 | A | * | 11/1994 | Harris | 347/115 |
| 5,432,537 | A | * | 7/1995 | Imakawa et al. | 347/135 |
| 5,450,175 | A | * | 9/1995 | Sato et al. | 399/201 |

(Continued)

FOREIGN PATENT DOCUMENTS

EP    0 713 118 A1 * 5/1996

(Continued)

*Primary Examiner*—Daniel J. Colilla
*Assistant Examiner*—Wasseem H. Hamdan
(74) *Attorney, Agent, or Firm*—Staas & Halsey LLP

(57) ABSTRACT

An image forming apparatus includes a semiconductor laser array to emit a plurality of laser beams through a plurality of independently controllable laser elements according to an image signal, an imaging optical system to magnify the laser beams emitted from the laser array, and a photosensitive drum having an imaging surface to form an electrostatic latent image by being photo-exposed through the imaging optical system. The imaging optical system includes a first mirror group having a plurality of reflection mirrors to reflect the laser beams emitted from the laser array, disposed at a given distance from the laser array, a second mirror group having a plurality of reflection mirrors to reflect the laser beams reflected from the first group, and a third mirror group having a plurality of reflection mirrors to reflect the laser beams reflected from the second group onto the imaging surfaces

21 Claims, 3 Drawing Sheets

U.S. PATENT DOCUMENTS

| | | | | |
|---|---|---|---|---|
| 5,461,413 A | | 10/1995 | Askinazi et al. | 347/243 |
| 5,471,236 A | * | 11/1995 | Ito | 347/233 |
| 5,475,416 A | * | 12/1995 | Kessler et al. | 347/244 |
| 5,617,133 A | * | 4/1997 | Fisli | 347/261 |
| 5,680,242 A | * | 10/1997 | Ando | 359/196 |
| 5,691,761 A | * | 11/1997 | Fisli | 347/241 |
| 5,701,190 A | * | 12/1997 | Mochizuki et al. | 359/205 |
| 5,724,087 A | * | 3/1998 | Sugano et al. | 347/243 |
| 5,771,061 A | * | 6/1998 | Komurasaki et al. | 347/242 |
| 5,801,746 A | * | 9/1998 | Yamaguchi et al. | 347/259 |
| 5,815,310 A | * | 9/1998 | Williamson | 359/365 |
| 5,835,123 A | * | 11/1998 | Chung et al. | 347/251 |
| 5,844,707 A | * | 12/1998 | Minakuchi et al. | 359/204 |
| 5,953,103 A | * | 9/1999 | Nakamura | 355/32 |
| 5,963,242 A | * | 10/1999 | Nakayama et al. | 347/238 |
| 5,991,063 A | * | 11/1999 | Ando | 359/204 |
| 6,008,925 A | * | 12/1999 | Conemac | 359/204 |
| 6,046,835 A | * | 4/2000 | Yamawaki et al. | 359/205 |
| 6,097,421 A | * | 8/2000 | Takeshita et al. | 347/258 |
| 6,178,029 B1 | * | 1/2001 | Kamikubo | 359/204 |
| 6,239,828 B1 | * | 5/2001 | Ito et al. | 347/241 |
| 6,275,249 B1 | * | 8/2001 | Ozaki et al. | 347/236 |
| 6,288,830 B1 | * | 9/2001 | Kinoshita | 359/292 |
| 6,323,889 B1 | * | 11/2001 | Miura | 347/234 |
| 6,381,057 B1 | * | 4/2002 | Itabashi | 359/204 |
| 6,503,361 B1 | * | 1/2003 | Nyui et al. | 156/345.13 |
| 6,504,639 B1 | * | 1/2003 | Yoshikawa et al. | 359/208 |
| 6,628,443 B1 | * | 9/2003 | Takada et al. | 359/204 |
| 6,833,939 B1 | * | 12/2004 | Ichikawa | 359/204 |

FOREIGN PATENT DOCUMENTS

| | | | |
|---|---|---|---|
| JP | 61-047914 | | 3/1986 |
| JP | 5-112032 | * | 7/1993 |
| JP | 9-197331 | * | 3/1997 |
| JP | 11-149054 | * | 11/1997 |
| JP | 10-239608 | * | 9/1998 |
| JP | 2001-026143 | | 1/2001 |

* cited by examiner

IMAGING OPTICAL SYSTEM, IMAGE FORMING APPARATUS HAVING THE SAME, AND A METHOD THEREFOR

CROSS-REFERENCE TO RELATED APPLICATIONS

This application claims the benefit of Korean Application No. 2002-1199, filed Jan. 9, 2002, in the Korean Industrial Property Office, the disclosure of which is incorporated herein by reference.

BACKGROUND OF THE INVENTION

1. Field of the Invention

The present invention relates to an imaging optical system, image forming apparatus having the same, and a method therefor, which are adapted for use in a printer, a copier, a facsimile machine, etc. More particularly, the present invention relates to an imaging optical system and image forming apparatus having the same, in which image beams, such as a laser beam, are emitted on an imaging surface of a photosensitive material by using a plurality of combined reflection mirrors.

2. Description of the Related Art

Generally, an image forming apparatus which is used in a printer, a copier, a facsimile machine, etc., has a laser scanning unit (LSU) to form an electrostatic latent image on a photosensitive material, such as a photosensitive drum. The image is formed by irradiating beams according to an image signal. The apparatus further has an image forming part to develop the electrostatic latent image formed on the photosensitive material into a toner image through a developer, such as colored toner, and transfer the image onto a sheet of printing paper to form a desired image.

To form the electrostatic latent image on the photosensitive material, the LSU has a light source having a plurality of luminous elements such as light emitting diodes (LED), laser diodes (LD), or vertical cavity surface emitting lasers (VCSEL), which are one or two-dimensionally arranged.

As an example of an LSU has a polygon mirror. The LSU changes beams emitted from the light source into parallel light beams through a collimating lens, leads the beams to the polygon mirror to deflect a reflective direction of the light beams, and then scans the beams as light spots conforming to a printing pattern on an imaging surface of the photosensitive material through an fθ lens to form the electrostatic latent image thereon.

However, the LSU employing the polygon mirror has a problem in that mechanical vibration and noise occur because of the mechanical rotation of a motor to rotate the polygon mirror during scanning. Specifically, in order to achieve a high scanning speed, the speed of revolution of the polygon mirror is increased, and the increase in noise is ever greater, and rotation accuracy and reliability of the motor are lowered because of an increase in a rotation load.

In order to overcome these problems, an LSU using an imaging optical system as a magnification optical system to image beams by using a plurality of combined lenses has been proposed. This LSU does not require a polygon mirror, and is shown in FIG. 1.

FIG. 1 illustrates an image forming apparatus 10 having a semiconductor laser array 1 in which a plurality of laser elements 1a are one or two-dimensionally arranged, and an imaging optical system 4 as a magnification optical system to magnify a plurality of laser beams emitted from the laser array 1 at a given angle and position . The apparatus 10 also includes a photosensitive drum 3 having an imaging surface to image the laser beams outputted from the imaging optical system 4 thereon, a drum driving circuit 5 to drive the photosensitive drum 3 at a given rotation speed and to output a timing signal synchronously with the rotation of the photosensitive drum 3, a signal processing circuit 7 to read an image signal from an image memory 6 and process the image signal to output a printing signal conforming to a printing pattern to a laser driving circuit 8, and a control circuit 9 to output a control signal to the laser driving circuit 8 synchronously with the timing signal from the drum driving circuit 5.

The imaging optical system 4 includes a first lens group 4a disposed at a photosensitive drum side of the imaging optical system 4 to image incident laser beams 2 traveling vertically from the laser elements 1a on the imaging surface of the photosensitive drum 3. The imaging optical system 4 further includes a second lens group 4b having a stop 4e and a composite focus 4d adjacent to the first lens group 4a toward the laser array 1, and a third lens group 4c disposed between the second lens group 4b and the laser array 1.

The second and third lens groups 4b, 4c form a telecentric optical system, so that the curvature of the laser beams 2 incident on the third lens group 4c and an aperture of the third lens group 4c can be reduced. Also, principal light beams 2a of the laser beams 2 from the laser array 1 are bent at two stages by the second lens group 4b and the third lens group 4c.

During operation of the apparatus 10, according to a printing command from a computer or central processing unit (CPU) (not shown), the signal processing circuit 7 reads an image signal from the image memory 6 and processes the signal to output a printing signal conforming to a printing pattern to the laser driving circuit 8.

At this time, the drum driving circuit 5 controls the photosensitive drum 3 to rotate at a given speed of rotation and simultaneously outputs a timing signal synchronous with the rotation of the photosensitive drum 3 to the control circuit 9. As the drum driving circuit 5 outputs the timing signal, the control circuit 9 outputs a control signal to the laser driving circuit 8 synchronously with the timing signal.

In response to the control signal from the control circuit 9 and the printing signal from the signal processing circuit 7, the laser driving circuit 8 drives the laser array 1. At this time, the laser array 1 emits the plurality of laser beams 2 in parallel with the optical axis (direction Z). The laser beams 2 first enter the imaging optical system 4, and the laser beams 2 incident upon the imaging optical system 4 are bent by light gathering action of the third and second lens groups 4c, 4b. Then, the laser beams 2 are gathered at the composite focus 4d positioned at an imaging surface side of the second lens group 4b, and are scanned in a main scanning direction as a plurality of light spots on the imaging surface of the photosensitive drum 3. At this time, since the photosensitive drum 3 is driven to be rotated in a sub-scanning direction by a driving motor (not shown), an electrostatic latent image conforming to the image signal is formed on the photosensitive drum 3. This is the result of the movement of the light spots in the main scanning direction and the movement of the photosensitive drum 3 in the sub-scanning direction.

However, in the above-described image forming apparatus 10, to reduce an optical aberration, distances D1', D2' between the laser array 1 and the second and third lens groups 4b, 4c are set beyond certain values, thereby resulting in the total length of the optical system being increased. Also, as the distances D1', D2' between the laser array 1 and the second and third lens groups 4b, 4c are increased, an area of the laser beams 2 incident on the imaging optical system 4 is enlarged and as a result, an effective aperture of the lenses forming the first and second lens groups 4a, 4b is increased.

Thus, in a case in which the total length of the optical system and size of the lenses are increased, the total size of the image forming apparatus is enlarged, and at the same time, a weight thereof is increased. Also, when the lenses have large apertures, designing surface shapes of the lenses into aspherical surfaces becomes impossible, and manufacturing processes such as lens design, mold production, injection molding, etc. become difficult, thereby resulting in increased manufacturing time and cost.

Also, in the conventional image forming apparatus 10, at least three lenses are required in the telecentric optical system in order to realize a resolution of more than 600 dpi, This complicates the design and also increases manufacturing costs.

Also, since the conventional image forming apparatus 10 has refracting surfaces of the lenses which are disposed with rotational symmetry with respect to the optical axis to thereby reduce the asymmetrical aberration, magnification powers in the main and sub-scanning directions are equal. Thus, if the magnification powers in the main and sub-scanning directions should differ, additional structures are required.

Another problem of the conventional imaging optical system 10 is that temperature changes cause the wavelength of the laser beams emitted from the laser array 1 to change, and thus, the refractive index of the lens material is changed, and image quality deteriorates.

SUMMARY OF THE INVENTION

Accordingly, it is an object of the present invention to provide an improved imaging optical system and image forming apparatus having the same, in which image beams are emitted from a light source on an imaging surface of photosensitive material by using a plurality of combined reflection mirrors having aspherical surfaces. Thus, design tolerances are increased and polygon mirrors and lenses having temperature-dependent refractive indices are not used.

Additional objects and advantages of the invention will be set forth in part in the description which follows and, in part, will be obvious from the description, or may be learned by practice of the invention.

The foregoing and other objects of the invention are achieved by providing an imaging optical system to image a plurality of beams emitted from a light source onto an imaging surface, including a first reflection mirror to reflect the beams emitted from the light source, spaced at a first given distance D1 from the light source; a second reflection mirror to reflect the beams reflected from the first mirror; and a third reflection mirror to reflect the beams reflected from the second mirror onto the imaging surface, spaced at a second distance D2 from the imaging surface.

According to an aspect of the present invention, the first, second and third reflection mirrors have a positive refractive power to converge the beams, a negative refractive power to diverge the beams, and a positive refractive power to converge the beams, respectively.

According to another aspect of the invention, the light source includes luminous elements which are one or two-dimensionally arranged. The luminous elements are light emitting diodes, laser diodes, or vertical cavity surface emitting lasers.

According to another aspect of the invention, the distances D1 and D2 satisfy the following mathematical formula:

$$1 < \left|\frac{D2}{D1}\right| < 10$$

According to another aspect of the invention, surface shapes of the reflection mirrors are spherical. Alternatively, the surface shapes of the reflection mirrors are aspherical and satisfy the following mathematical formula:

$$Z = \frac{C_1 y^2}{1 + \sqrt{1 - (K+1)C_1^2 y^2}} + \sum_{m=3}^{\infty} A_m Y^m + \frac{x^2 C_2 \left(1 + \sum_{n=3}^{\infty} B_n Y^n\right)}{1 + \sqrt{1 - \left(xC_2\left(1 + \sum_{n=3}^{\infty} B_n Y^n\right)\right)^2}}$$

in which:
m, n are positive numbers greater than 3,
K is a conical coefficient,
A, B are aspherical coefficients,
C is a curvature coefficient,
x, y are positions or distances to a point on the aspherical surface, and
Z is a distance from an optical axis.

The foregoing and other objects of the present invention may also be achieved by providing an image forming apparatus including a light source, having a plurality of luminous elements, to emit a plurality of beams according to an image signal, the luminous elements being independently controlled; an imaging optical system to magnify the beams emitted from the light source; and a photosensitive material having an imaging surface to form an electrostatic latent image by being photo-exposed by the light received from the imaging optical system, wherein the imaging optical system includes a first mirror group having a plurality of first reflection mirrors to reflect the beams emitted from the light source spaced from the light source; a second mirror group having a plurality of second reflection mirrors to reflect the beams reflected from the first mirror group; and a third mirror group having a plurality of third reflection mirrors to reflect the beams reflected from the second mirror group onto the imaging surface, spaced from the imaging surface of the photosensitive material.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
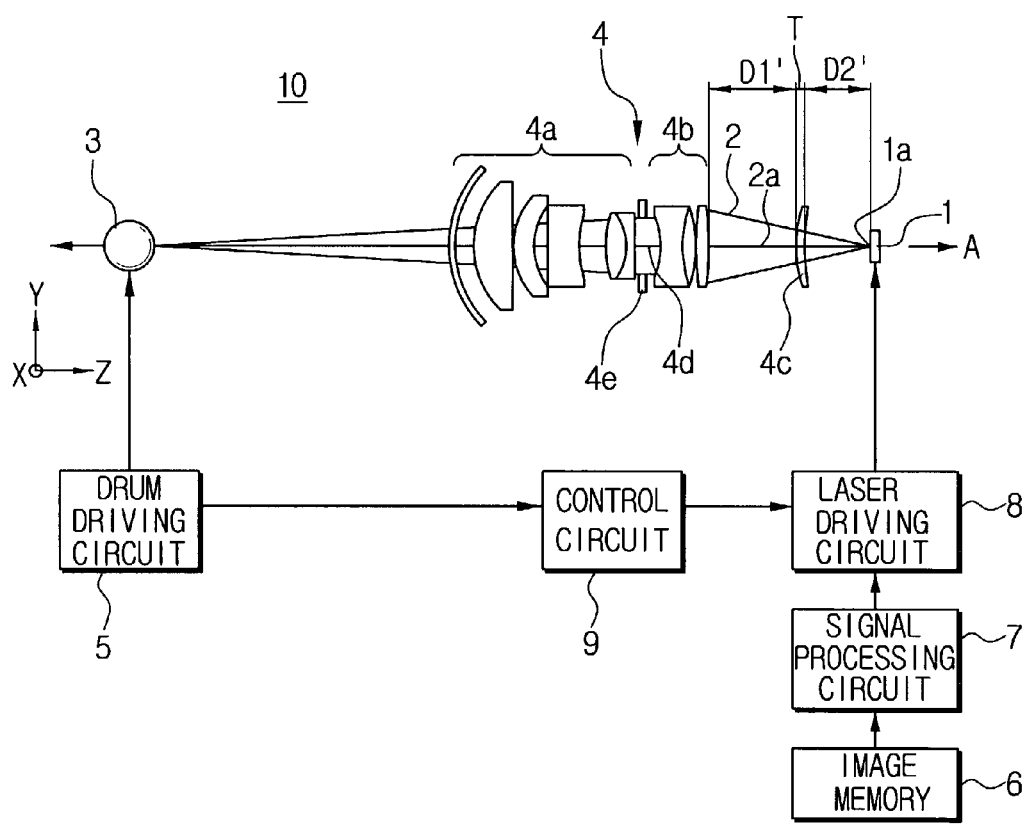
FIG. 1 is a schematic diagram of a known image forming apparatus.

Reference will now be made in detail to the present preferred embodiments of the present invention, examples of which are illustrated in the accompanying drawings, wherein like reference numerals refer to like elements throughout.

Figure 2:
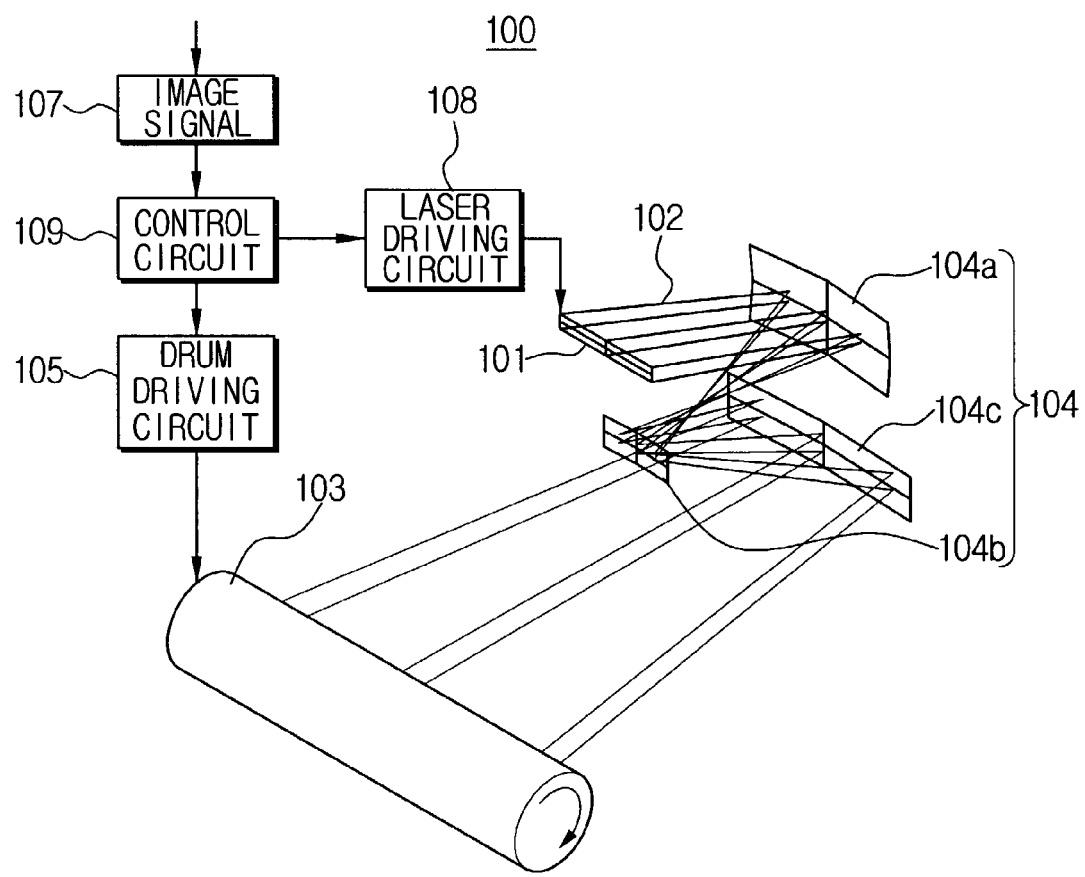
FIG. 2 is a schematic perspective view of an image forming apparatus having an imaging optical system in accordance with an embodiment of the present invention.

Referring now to FIG. 2, there is illustrated an image forming apparatus 100 having an imaging optical system in which reflection mirrors are used in accordance with an embodiment of the present invention.

The image forming apparatus 100 includes a semiconductor laser array 101 in which a plurality of laser elements are one or two-dimensionally arranged, an imaging optical system 104 to magnify a plurality of laser beams 102 emitted from the laser array 101 at a given angle and position by using reflection mirrors, and a photosensitive drum 103 having an imaging surface to image the laser beams 102 emitted from the imaging optical system 104 thereon . The apparatus 100 further includes a drum driving circuit 105 to drive the photosensitive drum 103 at a given speed of rotation and to output a timing signal synchronous with the rotation of the photosensitive drum 103, a control circuit 109 to output a printing signal and a driving signal to a laser driving circuit 108 and the drum driving circuit 105, respectively, by processing an image signal 107 outputted from a computer or CPU (not shown), and outputting a control signal to the laser driving circuit 108 synchronously with the timing signal of the drum driving circuit 105.

The laser elements of the laser array 101 may include LEDs, LDs or VCSELs.

The imaging optical system 104 includes a first reflection mirror 104a to reflect the laser beams 102 emitted from the laser array 101, and is spaced at a given distance from the laser array 101; a second reflection mirror 104b to reflect the laser beams 102 reflected from the first reflection mirror 104a; and a third reflection mirror 104c to reflect the laser beams 102 reflected from the second reflection mirror 104b onto the imaging surface of the photosensitive drum 103.

The first, second and third reflection mirrors 104a, 104b, 104c have a positive refractive power to converge the laser beams 102, a negative refractive power to diverge the laser beams 102, and a positive refractive power to converge the laser beams 102, respectively.

Accordingly, the laser beams 102 incident on the first reflection mirror 104a from the laser array 101 are reflected from a surface of the first reflection mirror 104a, and are changed into converging or condensing laser beams and are then reflected toward the second reflection mirror 104b. The converging laser beams incident on the second reflection mirror 104b from the first reflection mirror 104a are reflected from a surface of the second reflection mirror 104b, and are changed into diverging laser beams and are then reflected toward the third reflection mirror 104c. Also, at the third reflection mirror 104c, the diverging laser beams are again changed into converging laser beams and are then imaged on the imaging surface of the photosensitive drum 103.

This design of the imaging optical system 104 ensures magnification, i.e., focus of the imaging optical system 104, to be easily adjusted by changing a distance D1 (see FIG. 3) between the laser array 101 and the first reflection mirror 104a, a distance between the first reflection mirror 104a and the second reflection mirror 104b, and a distance D2 (see FIG. 3) between the third reflection mirror 104c and the imaging surface of the photosensitive drum 103.

Particularly, the distance D1 between the laser array 101 and the first reflection mirror 104a and the distance D2 between the third reflection mirror 104c and the imaging surface of the photosensitive drum 103 satisfy the following mathematical formula (1):

$$1 < \left|\frac{D2}{D1}\right| < 10$$

Also, in the imaging optical system 104, since the path of the laser beams 102 can be freely adjusted according to respective angles and positions of the reflection mirrors 104a, 104b, 104c, the imaging optical system 104 can be designed so that magnifications in main and sub-scanning directions are different from one another, or that surface shapes of the reflection mirrors 104a, 104b, 104c are formed of spherical or aspherical surfaces.

When the surface shapes of the reflecting mirrors are formed of the aspherical surfaces, the following mathematical formula 2 is satisfied:

$$Z = \frac{C_1 y^2}{1 + \sqrt{1-(K+1)C_1^2 y^2}} + \sum_{m=3}^{\infty} A_m Y^m + \frac{\left(x^2 C_2 \left(1 + \sum_{n=3}^{\infty} B_n Y^n\right)\right)}{\left(1 + \sqrt{1 - (xC_2\left(1 + \sum_{n=3}^{\infty} B_n Y^n\right))}\right)^2} \quad (2)$$

in which:
m, n are positive numbers greater than 3,
K is a conical coefficient,
A, B are aspherical coefficients,
C is a curvature coefficient,
x, y are positions or distances to a point on the aspherical surface, and
Z is a distance from an optical axis.

Thus, the imaging optical system 104 of the present invention has a compact structure and superior image quality by using a mirror optical system having combined reflection mirrors to bend the path of the laser beams 2, instead of the conventional telecentric optical system having lenses. Although three reflection mirrors are described above, the number of the reflection mirrors may vary to change the path of the laser beams, or to increase or decrease the number of times the laser beams are reflected.

The image forming apparatus 100 of the present invention further includes an image forming part (not shown) having a charger, a cleaner, a development roller, a developer, and a transferrer, to carry out a series of image forming process to form a toner image on a printing material such a sheet of printing paper; a paper-feeding part (not shown) to feed the printing paper to the transferrer; a fixing part (not shown) to fix the toner image transferred onto the printing paper, and a paper-discharging part (not shown) to discharge the printing paper on which the toner image is fixed. Since the structure of these components is the same as that of the conventional image forming apparatus, a detailed explanation will be omitted.

Figure 3:
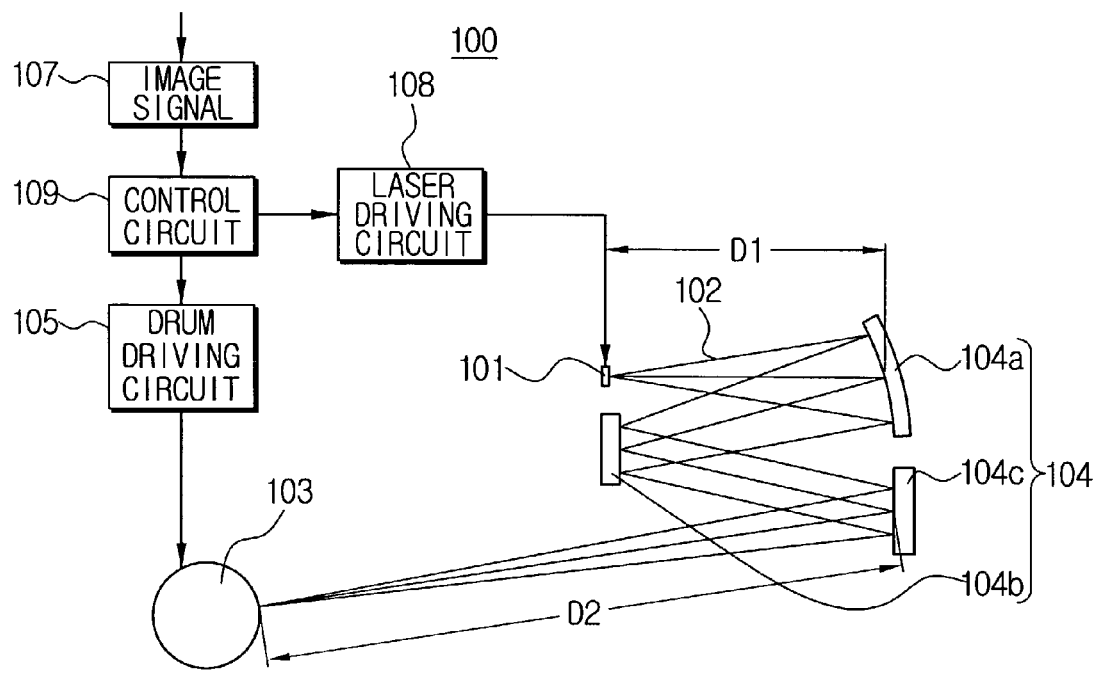
FIG. 3 is a side elevation view of the image forming apparatus shown in FIG. 2.

Operation of the image forming apparatus 100 having the imaging optical system 104 in accordance with the present invention will now be explained with reference to FIG. 2 and FIG. 3.

First, according to an image signal inputted from the computer or CPU of the image forming apparatus 100, the control circuit 109 processes the image signal 107 and outputs printing and driving signals to the laser driving circuit 108 and the drum driving circuit 105, respectively.

At this time, the drum driving circuit 105 provides control to rotate the photosensitive drum 103 at a given rotation speed and simultaneously outputs a timing signal synchronous with the rotation of the photosensitive drum 103 to the control circuit 109. As the drum driving circuit 105 outputs the timing signal, the control circuit 109 outputs a control signal to the laser driving circuit 108 synchronously with the timing signal.

In response to the control signal and the printing signal from the control circuit 109, the laser driving circuit 108 drives the laser array 101. At this time, the laser array 101 emits the plurality of laser beams 102 at predetermined angles from respective laser elements. The laser beams 102 emitted from the laser array 101 enter the imaging optical system 104.

The laser beams 102 incident on the imaging optical system 104 are first incident on the first reflection mirror 104a having the positive refractive index. Then, the laser beams 102 are reflected from a surface of the first reflection mirror 104a and are simultaneously changed into converging laser beams. The converging laser beams 102 are then incident on the second reflection mirror 104b having the negative refractive index. At the second reflection mirror 104b, the laser beams 102 are reflected from the surface thereof and are changed into diverging laser beams, and then are incident on the third reflection mirror 104c having the positive refractive index. At the third reflection mirror 104c, the diverging laser beams 102 are again changed into converging laser beams and are then scanned in a main scanning direction as a plurality of light spots on the imaging surface of the photosensitive drum 103. At this time, since the photosensitive drum 103 is driven to be rotated in the sub-scanning direction (indicated by the arrow) by a driving motor (not shown), an electrostatic latent image conforming to the image signal is formed on the photosensitive drum 103 as a result of the movement of the light spots in the main scanning direction, and the movement of the photosensitive drum 103 in the sub-scanning direction.

Thereafter, the electrostatic latent image on the photosensitive drum 103 is developed into a toner image by the development roller and a developer such as colored toner. As the photosensitive drum 103 on which the toner image is formed is further rotated, the toner image is transferred onto the printing paper fed from the paper-feeding part by the transfer roller of the transferrer. Next, the photosensitive drum 103 continues to rotate, and a cleaning blade (not shown) of the cleaner removes developer remaining on the imaging surface of the photosensitive drum 103, so that another electrostatic latent image can be formed thereon.

At this time, the toner image transferred onto the printing paper is fixed by the fixing part and then the printing paper on which the toner image is fixed is discharged to the outside by a paper-discharging part. In this way, a high quality image is formed on the printing paper.

As is apparent from the foregoing description, it can be appreciated that in the image forming apparatus 100, since laser beams are imaged on the imaging surface of the photosensitive drum 103 by the imaging optical system 104 having combined reflection mirrors noise, size, weight and manufacturing costs are reduced.

Also, in the image forming apparatus 100 having the imaging optical system 104, since reflection mirrors are used, surface shapes of the reflection mirrors can be formed of aspherical surfaces and main and sub-scanning magnification powers can be designed to be the same or different from one another, and thereby design tolerances can be increased to obtain a high quality image.

Also, in the image forming apparatus 100 having the imaging optical system 104, even though the wavelength of the laser beams 102 emitted from the laser array 101 changes according to temperature, deterioration in image quality as a result of a corresponding change in refractive index of lens materials can be prevented.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An imaging optical system to image a plurality of beams emitted from a light source onto an imaging surface, comprising:

a first reflection mirror to directly receive the beams emitted from the light source and reflect the received beams, spaced at a first distance D1 from the light source;

a second reflection mirror to reflect the beams reflected from the first mirror; and a third reflection mirror to reflect the beams reflected from the second reflection mirror onto the imaging surface, spaced at a second distance D2 from the imaging surface, a magnification of the system being adjusted by varying the first and second distances, the first, second and third reflection mirrors not being rotary mirrors, and the beams being reflected directly from the first reflection mirror to the second reflection mirror and directly from the second reflection mirror to the third reflection mirror.

2. An imaging optical system to image a plurality of beams emitted from a light source onto an imaging surface, comprising:

a first reflection mirror to reflect the beams emitted from the light source, spaced at a first distance D1 from the light source;

a second reflection mirror to reflect the beams reflected from the first mirror; and a third reflection mirror to reflect the beams reflected from the second reflection mirror onto the imaging surface, spaced at a second distance D2 from the imaging surface, wherein the first, second and third reflection mirrors have a positive refractive power to converge the beams, a negative refractive power to diverge the beams, and a positive refractive power to converge the beams, respectively.

3. The imaging optical system according to claim 2, wherein the light source includes a plurality of luminous elements which are one or two-dimensionally arranged.

4. The imaging optical system according to claim 3, wherein the luminous elements comprise light emitting diodes, laser diodes, or vertical cavity surface emitting lasers.

5. The imaging optical system according to claim 4, wherein D1 and D2 satisfy:

$$1 < \left|\frac{D2}{D1}\right| < 10$$

6. The imaging optical system according to claim 5, wherein a surface of one of the first, second and third reflection mirrors has a spherical shape.

7. The imaging optical system according to claim 5, wherein a surface of one of the first, second and third reflection mirrors has an aspherical shape satisfying:

$$Z = \frac{C_1 y^2}{1 + \sqrt{1-(K+1)C_1^2 y^2}} + \sum_{m=3}^{\infty} A_m Y^m + \frac{x^2 C_2 \left(1 + \sum_{n=3}^{\infty} B_n Y^n\right)}{1 + \sqrt{1 - \left(xC_2\left(1 + \sum_{n=3}^{\infty} B_n Y^n\right)\right)^2}}$$

in which m, n are positive numbers greater than 3,
K is a conical coefficient,
A, B are aspherical coefficients,
C is a curvature coefficient,
x, y are positions or distances to a point on the aspherical surface, and
Z is a distance from an optical axis of reflection mirror.

8. The imaging optical system according to claim 4, wherein a surface of one of the first, second or third reflection mirrors has a spherical shape.

9. The imaging optical system according to claim 4, wherein a surface of one of the first, second and third reflecting mirrors has an aspherical shape satisfying:

$$Z = \frac{C_1 y^2}{1 + \sqrt{1-(K+1)C_1^2 y^2}} + \sum_{m=3}^{\infty} A_m Y^m + \frac{x^2 C_2 \left(1 + \sum_{n=3}^{\infty} B_n Y^n\right)}{1 + \sqrt{1 - \left(xC_2\left(1 + \sum_{n=3}^{\infty} B_n Y^n\right)\right)^2}}$$

in which m, n are positive numbers greater than 3,
K is a conical coefficient,
A, B are aspherical coefficients,
C is a curvature coefficient,
x, y are positions or distances to a point on the aspherical surface, and
Z is a distance from an optical axis of reflection mirror.

10. An image forming apparatus comprising:
a light source, having a plurality of luminous elements, to emit a plurality of beams according to an image signal, the luminous elements being independently controlled;
an imaging optical system to magnify the beams emitted from the light source; and
a photosensitive material having an imaging surface to form an electrostatic latent image by being photo-exposed by the light received from the imaging optical system;

wherein the imaging optical system comprises:
a first mirror group having a plurality of first reflection mirrors to reflect the beams emitted from the light source, spaced from the light source;
a second mirror group having a plurality of second reflection mirrors to reflect the beams reflected from the first mirror group away from and not towards the second mirror group; and
a third mirror group having a plurality of third reflection mirrors to reflect the beams reflected from the second mirror group onto the imaging surface, spaced from the imaging surface of the photosensitive material.

11. An imaging optical system to image a plurality of beams emitted from a light source onto an imaging surface, comprising:
a non-rotary first mirror to directly receive the beams emitted from the light source and reflect the received beams;
a non-rotary second mirror to reflect the beams reflected by the first mirror onto the imaging surface; and
a non-rotary third mirror on an optical path of the beams between the first and second mirrors,
wherein the beams are reflected directly from the first mirror to the third mirror and directly from the third mirror to the second mirror, the first mirror is spaced at a first distance D1 from the light source, the second mirror is spaced at a second distance D2 from the imaging surface, and $$1 < \left|\frac{D2}{D1}\right| < 10$$

12. The imaging optical system according to claim 11, wherein the light source and the imaging surface comprise a printer, a copier, or a facsimile machine.

13. An imaging optical system to image a plurality of beams emitted from a light source onto an imaging surface, comprising:
a first mirror to reflect the beams emitted from the light source;
a non-rotary second mirror to reflect the beams reflected by the first mirror directly onto the imaging surface; a first mirror group comprising a plurality of the first mirrors to reflect the emitted beams;
a third mirror group comprising a plurality of third mirrors to reflect the beams reflected from the first mirror group; and
a second mirror group comprising a plurality of the second mirrors to reflect the beams reflected from the third mirror group,
wherein the first mirror is spaced at a first distance D1 from the light source, the second mirror is spaced at a second distance D2 from the imaging surface, and $$1 < \left|\frac{D2}{D1}\right| < 10$$

14. An image forming apparatus, comprising:
a light source to emit a plurality of beams;
an image adjusting apparatus, comprising:
a first mirror to directly receive the beams emitted from the light source and reflect and refract the received beams, a second mirror to reflect and refract the beams reflected by the first mirror, and a third mirror to reflect and refract the beams reflected from the second mirror; and an imaging surface to receive the beams reflected from the third mirror and form an image thereon, wherein the first, second and third mirrors are non-rotary, and the beams are reflected directly from the first reflection mirror to the second reflection mirror and directly from the second reflection mirror to the third reflection mirror.

15. The imaging optical system according to claim 14, wherein the image forming apparatus is a printer, a copier, or a facsimile machine.

16. A method of generating an image on an imaging surface, comprising:

emitting a plurality of beams from a light source;

receiving directly the emitted beams with first group of reflection mirrors;

reflecting the emitted beams with the first group of reflection mirrors;

directly receiving and reflecting the beams reflected by the first group of reflection mirrors with a second group of reflection mirrors;

directly receiving and reflecting the beams reflected by the second group of reflection mirrors with a third group of non-rotary reflection mirrors; and directly receiving the beams reflected by the third group of reflection mirrors at the imaging surface to form the image thereon.

17. The method according to claim 16, further comprising:

adjusting a focus of the image, comprising:

changing a distance between the light source and the first group of reflection mirrors.

18. A method of generating an image on an imaging surface, comprising:

emitting a plurality of beams from a light source;

receiving directly the emitted beams with a first group of reflection mirrors;

reflecting the received beams with the first group of reflection mirrors;

directly receiving and reflecting the beams reflected by the first group of reflection mirrors with a second group of reflection mirrors;

directly receiving and reflecting the beams reflected by the second group of reflection mirrors with a third group of reflection mirrors;

receiving the beams reflected by the third group of reflection mirrors at the imaging surface to form the image thereon; and adjusting a focus of the image, comprising:

changing a distance between the light source and the first group of reflection mirrors, and changing a distance between the imaging surface and the third group of reflection mirrors.

19. An image forming apparatus comprising:

a light source emitting a plurality of beams;

a first reflection mirror to directly receive and simultaneously reflect and converge or diverge the beams emitted from the light source, spaced at a predetermined distance from the light source;

a second reflection mirror to directly receive the reflected beams from the first reflection mirror and reflect the received beams;

a third reflection mirror to directly receive the reflected beams from the second reflection mirror; and a photosensitive body having an imaging surface to image the beams reflected from the third reflection mirror.

20. The apparatus according to claim 19, wherein the reflection mirror comprises a plurality of reflective surfaces.

21. A method of imaging a plurality of beams emitted from a light source onto an imaging surface in an optical system, comprising:

receiving directly the emitted beams with a first reflection mirror spaced at a first distance D1 from the light source;

reflecting the beams emitted from the light source with the first reflection mirror;

directly receiving and reflecting the beams reflected from the first mirror with a second reflection mirror;

directly receiving and reflecting the beams reflected from the second reflection mirror onto the imaging surface with a third reflection mirror, spaced at a second distance D2 from the imaging surface;

and adjusting a magnification of the system comprising varying the first and second distances.

* * * * *

UNITED STATES PATENT AND TRADEMARK OFFICE
CERTIFICATE OF CORRECTION

PATENT NO. : 7,088,382 B2
APPLICATION NO. : 10/200759
DATED : August 8, 2006
INVENTOR(S) : Hyung-su Kim It is certified that error appears in the above-identified patent and that said Letters Patent is hereby corrected as shown below:

Title Page, item [57]: (Abstract), Line 16, change "surfaces" to --surface.--

Column 9, Line 5, after " $1 < \left| \dfrac{D2}{D1} \right| < 10$ " insert --.--.

Signed and Sealed this

Sixth Day of November, 2007

JON W. DUDAS
*Director of the United States Patent and Trademark Office*